US007538990B2

(12) United States Patent
Belisle et al.

(10) Patent No.: US 7,538,990 B2
(45) Date of Patent: May 26, 2009

(54) HIGH VOLTAGE DC CONTACTOR HYBRID WITHOUT A DC ARC BREAK

(75) Inventors: Francis C. Belisle, Roscoe, IL (US); Eric A. Carter, Monroe, WI (US); Mark W. Metzler, Davis, IL (US); Jeffrey T. Wavering, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 11/638,984

(22) Filed: Dec. 14, 2006

(65) Prior Publication Data

US 2008/0143462 A1 Jun. 19, 2008

(51) Int. Cl.
*H02H 3/00* (2006.01)
*H02H 7/00* (2006.01)
*H01H 9/30* (2006.01)
*H01H 9/56* (2006.01)
*H01H 73/18* (2006.01)

(52) U.S. Cl. ...................... 361/2; 361/3; 361/8; 361/13

(58) Field of Classification Search ................. 361/2–3, 361/8, 13

See application file for complete search history.

(56) References Cited

U.S. PATENT DOCUMENTS 3,644,790 A * 2/1972 Kozlovic et al. ............ 361/114
4,658,320 A * 4/1987 Hongel ........................ 361/13
5,170,310 A * 12/1992 Studtmann et al. ............ 361/94
5,216,352 A * 6/1993 Studtmann et al. .......... 323/241
6,563,326 B1 * 5/2003 Huebsch ..................... 324/609
6,643,112 B1 * 11/2003 Carton et al. ............... 361/152
7,276,871 B2 * 10/2007 Ganev et al. ................ 318/434
2004/0027734 A1 * 2/2004 Fairfax et al. .................. 361/2
2004/0165322 A1 * 8/2004 Crawford et al. ............... 361/2
2004/0179313 A1 * 9/2004 Cleveland ...................... 361/2
2007/0052397 A1 * 3/2007 Thompson et al. .......... 323/223

* cited by examiner

*Primary Examiner*—Stephen W Jackson
*Assistant Examiner*—Dharti H Patel
(74) *Attorney, Agent, or Firm*—Carlson, Gaskey & Olds

(57) ABSTRACT

An apparatus, and a method of opening and closing electrical power feed lines using a hybrid contactor, which combines a traditional set of mechanical main contacts with a high voltage solid state switch. The solid state switch provides a parallel current path around the main contacts. When the main contacts are to be opened or closed, the solid state switch is first closed, diverting current away from the main contacts to prevent arc formation when the main contacts are being opened or closed. Once the main contacts are opened or closed, the solid state switch is opened, as the parallel current path is no longer needed. Optional auxiliary contacts are connected in series with the solid state switch to provide galvanic isolation between an input terminal and an output terminal.

14 Claims, 5 Drawing Sheets

HIGH VOLTAGE DC CONTACTOR HYBRID WITHOUT A DC ARC BREAK

BACKGROUND OF THE INVENTION

This invention relates generally to vehicle power systems, and more specifically, to direct current contactors.

Vehicles, such as aircraft, rely on contactors and relays for protection and control of opening and closing electrical power feed lines. A typical vehicle may contain a hundred or more contactors. In an alternating current voltage system, an electric current follows a waveform, typically a sine wave, and there exists a zero voltage cross over point on that waveform. If a contactor is opened at the cross over point, the arc problem described below that exists in direct current systems will not occur.

In a direct current voltage system, there is no zero voltage cross over point. If a set of DC contacts are opened, an electric arc will form in a gas-filled space between the contacts, and without intervention will continue until the space between the electrical contacts is too large to sustain the arc. An arc can produce a very high temperature and is undesirable in a vehicle power system, as it can damage a contactor and can decrease the life span of a contactor.

One solution to this problem is an arc chute. An arc chute is used to stretch an arc a sufficient distance so that the voltage cannot support the arc, and the arc will eventually break. However in a high voltage DC system, such a contactor becomes undesirably large due to the size required for the arc chute and the large spacing required between the contacts within the contactor.

Another solution to the DC arc problem is to create a hermetically sealed container to enclose the contacts. In this solution, the container is typically metal, and is typically soldered for an airtight seal. The container is then either hooked to a hard vacuum to remove air, or the container is filled with an inert gas. The absence of air decreases the distance that the arc can be maintained for the voltage in the atmosphere around the contacts. Side magnets are sometimes used in a hermetically sealed contactor to pull the arc and eventually break it. The hermetic cavity of the construction, however, makes the manufacture of the contactor difficult and costly.

There is a need for a low cost and/or non-hermetic contactor that can switch high voltage DC current with high reliability, preferably without the need for an arc chute.

SUMMARY OF THE INVENTION

The present invention addresses the problem of DC arc formation through the use of a hybrid contactor. The hybrid contactor combines a traditional set of mechanical main contacts with a high voltage solid state switch. The solid state switch provides a parallel current path to the main contacts. A set of secondary auxiliary contacts in series with the solid state switch may also be used. When the main contacts are to be opened or closed, the solid state switch is closed, diverting current away from the contacts so that no arc is formed when the main contacts are opened or closed. Once the main contacts are opened or closed, the solid state switch is then opened. Auxiliary contacts, if present, are closed prior to closing the solid state switch, and are opened prior to opening the solid state switch.

These and other features of the present invention can be best understood from the following specification and drawings, the following of which is a brief description.

DETAILED DESCRIPTION OF THE PREFERRED EMBODIMENT

Figure 1:
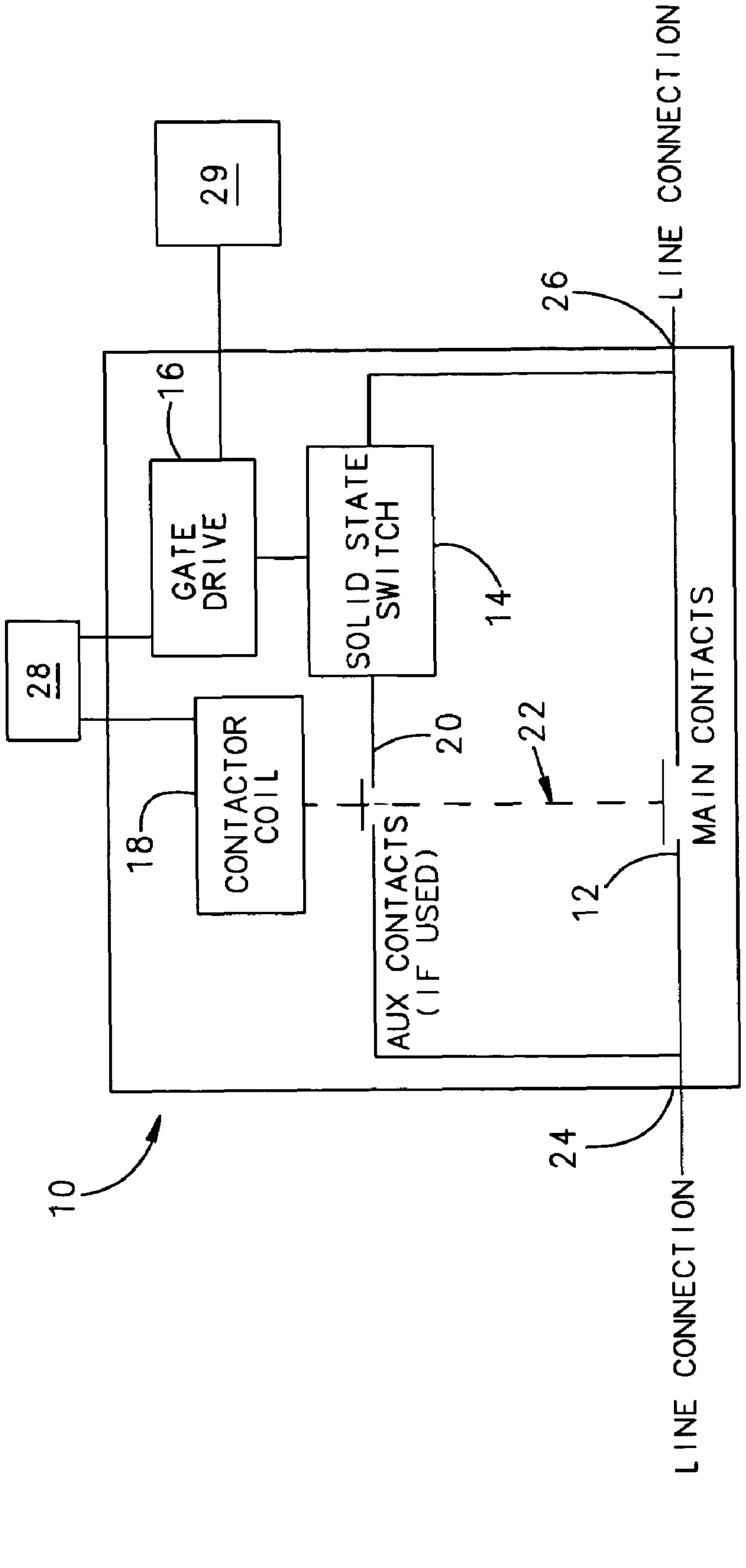
FIG. 1 illustrates a contactor employing the present invention.

FIG. 1 illustrates a high-level representation of a contactor embodying the present invention. A contactor 10 combines a traditional set of mechanical main contacts 12 with a high voltage solid state switch 14. The solid state switch 14 provides a parallel current path to the main contacts 12. The main contacts 12 could comprise an incoming wire, an outgoing wire, and a moving part to connect them, or the main contacts 12 could comprise a plurality of incoming wires, a plurality of outgoing wires, and a moving part to connect them. A set of optional auxiliary contacts 20 is connected in series with the solid state switch 14. A gate drive 16 operates to open and close the solid state switch 14. When the gate drive 16 is turned on, the solid state switch 14 closes, and when the gate drive 16 is turned off, the solid state switch 14 opens. A contactor coil 18 is used to provide power for an actuator shaft 22. The actuator shaft 22 mechanically opens and closes the main contacts 12 and the optional auxiliary contacts 20. Line connections 24 and 26 connect the contactor 10 to external circuit components. Controller 28 controls gate drive 16 and contactor coil 18. Power source 29 provides power to gate drive 16.

When the controller 28 needs the contactor 10 to relay current, a command signal is given to close the contactor 10, the auxiliary contacts 20 are closed, then the solid state switch 14 is closed, and then the main contacts 12 are closed. During the short period of time in which the main contacts 12 are closing, current flows through the solid state switch 14. With this parallel path, the voltage across the main contacts 12 is close to zero when the contacts are closing. This prevents arcing when the main contacts 12 close, and also increases the life of the contacts. Once the main contacts 12 are closed, the solid state switch 14 is opened, and then the auxiliary contacts 20 are opened. The opening of the solid state switch 14 can be based on either timing or feedback. Despite the criteria used for the decision, the controller 28 would still make the decision about when to close the main contacts 12.

When the controller 28 needs the contactor 10 to stop relaying current, a command signal is given to open the contactor 10, the auxiliary contacts 20 are closed, then the solid state switch 14 is closed, and then the main contacts 12 are opened. As in the case of the command to close the main contacts 12, the parallel current path provided by the solid state switch 14 prevents the formation of a DC arc between the main contacts 12 by diverting the flow of current away from the main contacts 12. Once the main contacts 12 are opened, the solid state switch 14 is opened, and then the auxiliary contacts 20 are opened.

A typical solid state switch 14 contains silicon, which heats up very quickly. The contactor 10 is designed so that the solid state switch 14 remains closed for an extremely short period of time. This prevents the solid state switch 14 from overheating, and this also prevents the need for a heat sink to cool the solid state switch 14.

The auxiliary contacts 20 are optional, and provide additional safety, as they prevent the possibility of a high voltage existing at contactor output terminal line connections 24 and 26. The solid state switch 14 is a transistor-based switch, and carries the risk that even if open, a partial flow of current can still cross the switch. The auxiliary contacts 20 prevent this problem by providing galvanic isolation on the output terminal line connections 24 and 26. Thus, although auxiliary contacts 20 are optional, it is desirable to incorporate them into a contactor.

Figure 2:
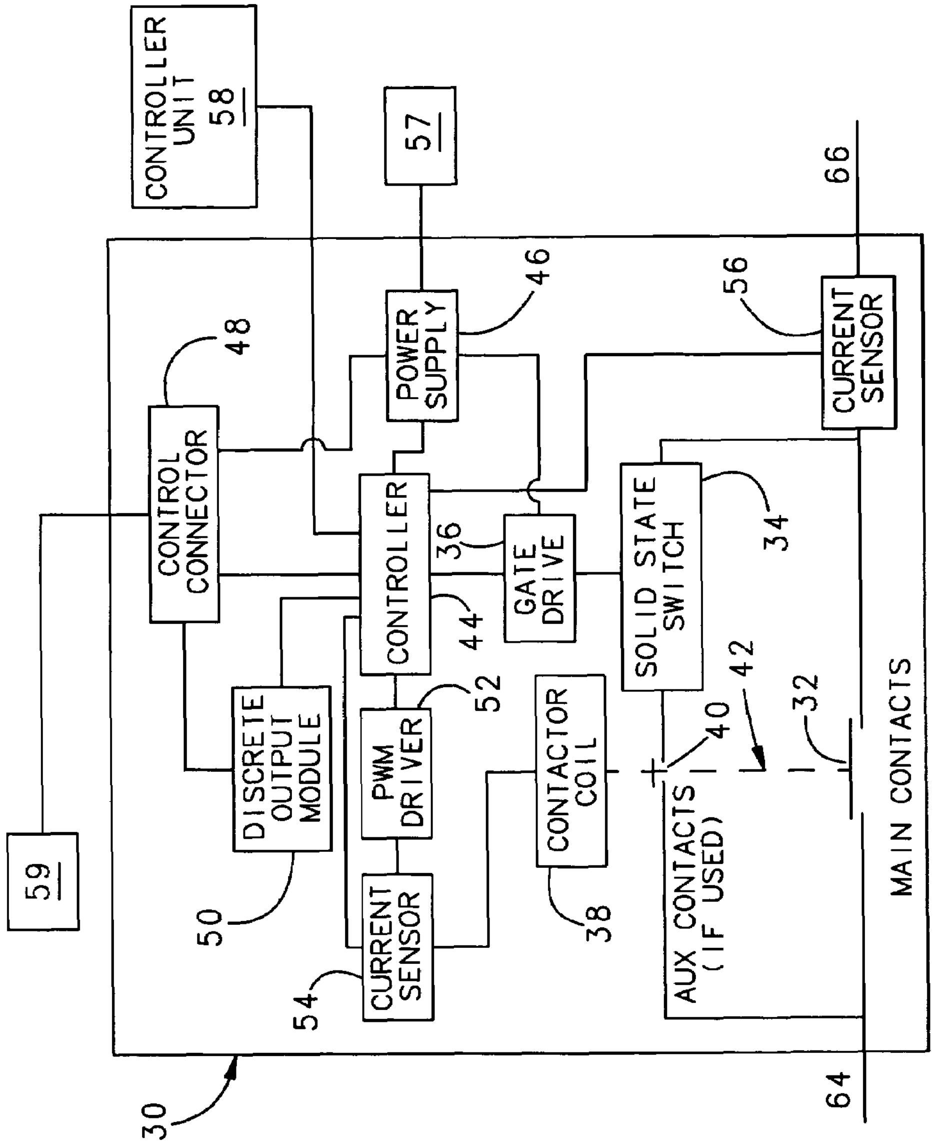
FIG. 2 illustrates a contactor employing the present invention, along with associated controller logic.

FIG. 2 illustrates a more detailed schematic diagram of a contactor 30 embodying the present invention and incorporating some features known in the art. An external controller unit 58 transmits commands to a controller 44 to either open or close the contactor 30. A discrete output module 50 provides status information to a control connector 48, which then transmits the status information to an external system controller 59. A power supply 46 obtains power from an external power source 57 and provides power to a gate drive 36, a controller 44, and the control connector 48. Contactor 30 further comprises main contacts 32, a solid state switch 34, a contactor coil 38, a set of auxiliary contacts 40, and an actuator shaft 42 that all operate as described above. The contactor 30 further comprises a current sensor 54 and a current sensor 56. Current sensor 54 monitors current in the contactor coil 38. Current sensor 56 is used to notify the controller 44 if a fault is detected. As in FIG. 1, the auxiliary contacts 40 are optional.

If controller 44 receives a message to close the contactor 30, the controller 44 first checks to make sure that the main contacts 32 are actually opened. Controller 44 utilizes current sensor 54 to obtain confirmation from the contactor coil 38 that the main contacts 32 are actually open. If main contacts 32 already closed, then the command to close the main contacts 32 is cancelled.

If confirmation is received that the main contacts 32 are actually open, controller 44 utilizes pulse width modulation (PWM) driver 52 to activate the actuator shaft 42 to close the auxiliary contacts 40. Controller 44 then closes the solid state switch 34, and then closes the main contacts 32. Once main contacts 32 are actually closed, the solid state switch 34 is opened, and the auxiliary contacts 40 are opened. As in FIG. 1, the solid state switch 34 is closed for only an extremely short period of time, and arc formation is prevented.

When controller 44 receives a command to open the main contacts 32, it similarly confirms that the main contacts 32 are actually closed. If the main contacts 32 are already open, the command is cancelled. If the controller 44 receives confirmation from current sensor 54 that the main contacts 32 are actually closed, the controller 44 then utilizes PWM driver 52 to close the auxiliary contacts 40. Controller 44 then closes solid state switch 34, opens main contacts 32, opens solid state switch 34, and then opens auxiliary contacts 40.

Figure 3:
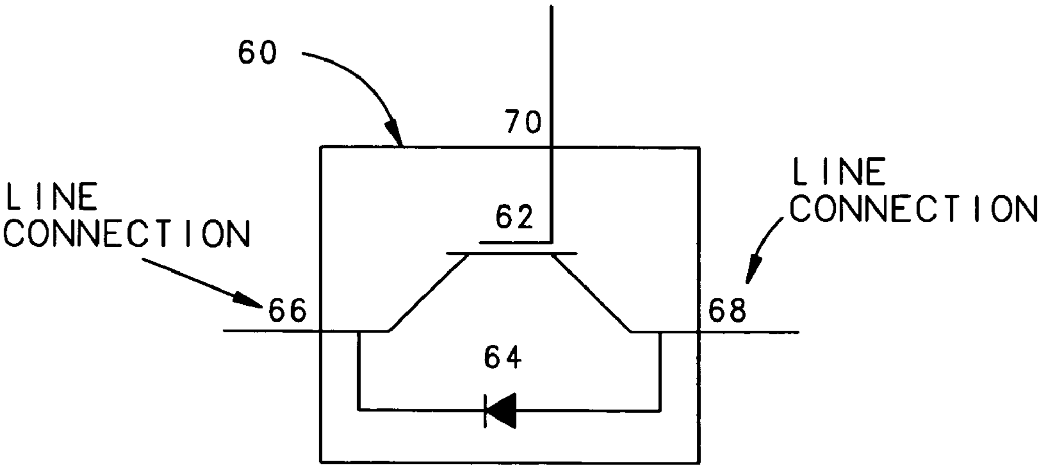
FIG. 3 illustrates a solid state switch for a unidirectional DC contactor.
Figure 4:
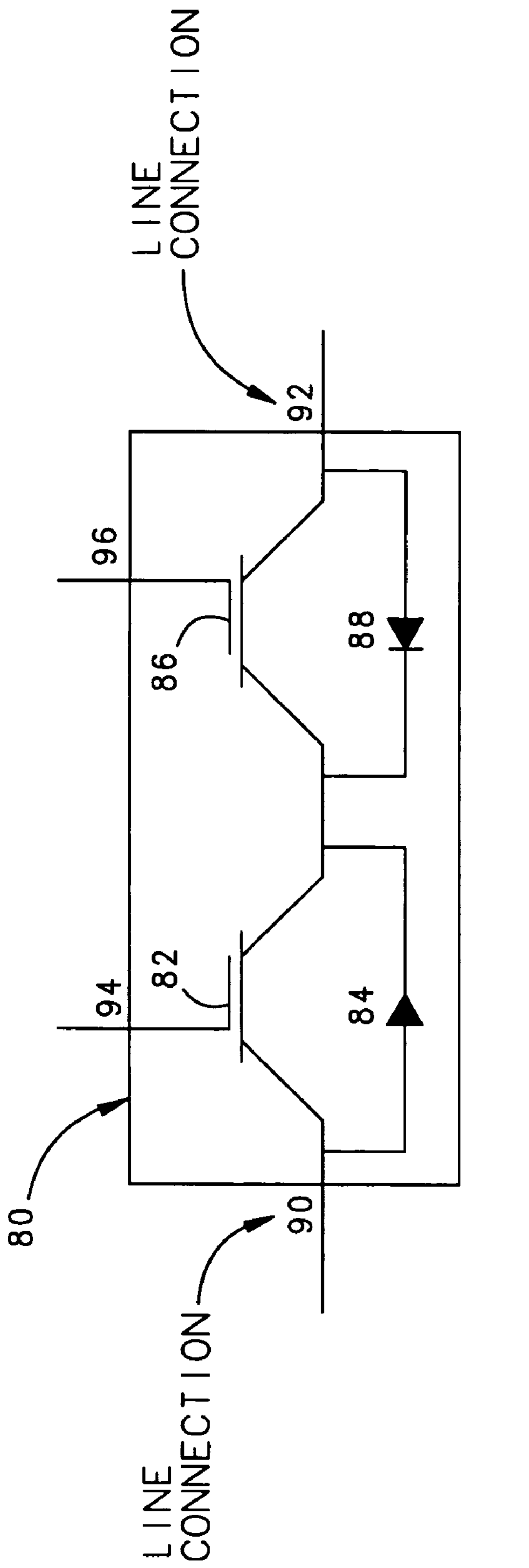
FIG. 4 illustrates a solid state switch for a bidirectional DC contactor.

FIGS. 3 and 4 illustrate example solid state switches that can be interchangeably used in the contactors of FIGS. 1 and 2, depending on if a unidirectional or a bidirectional contactor is desired. A unidirectional contactor carries current in only one direction. An example unidirectional contactor could carry current from a vehicle power source to a load. A bidirectional contactor is able to carry current in either direction. Bidirectional contactors are, however, typically more expensive to produce. An example bidirectional contactor is a bow tie contactor.

FIG. 3 illustrates a solid state switch 60 for a unidirectional DC contactor. The solid state switch 60 comprises both a transistor 62 and a diode 64 connected in parallel. In one example the transistor 62 could be an IGBT or a high voltage MOSFET. The solid state switch 60 has three connections: a first line connection 66, a second line connection 68, and a gate drive connection 70. In this example unidirectional DC contactor, current would flow in from line connection 66 and would flow out from line connection 68. Gate drive connection 70 would be hooked up to an external gate drive which would be operable to turn the solid state switch 60 OFF or ON.

FIG. 4 illustrates a solid state switch 80 for a bidirectional DC contactor. The solid state switch 80 contains a first transistor 82 and diode 84 pair, and a second transistor 86 and diode 88 pair. Transistor 82 and diode 84 are in parallel to each other, and transistor 86 and diode 88 are in parallel to each other. The first transistor and diode pair is in series with the second transistor and diode pair. As in FIG. 3, in one example the transistors 82 and 86 could be IGBTs or high voltage MOSFETs. The solid state switch 80 has four external connections: a first line connection 90, a second line connection 92, and two gate drive connections 94 and 96. Gate drive connections 94 and 96 would connect to a single gate drive, which would be operable to turn the solid state switch 80 OFF or ON.

Figure 5:
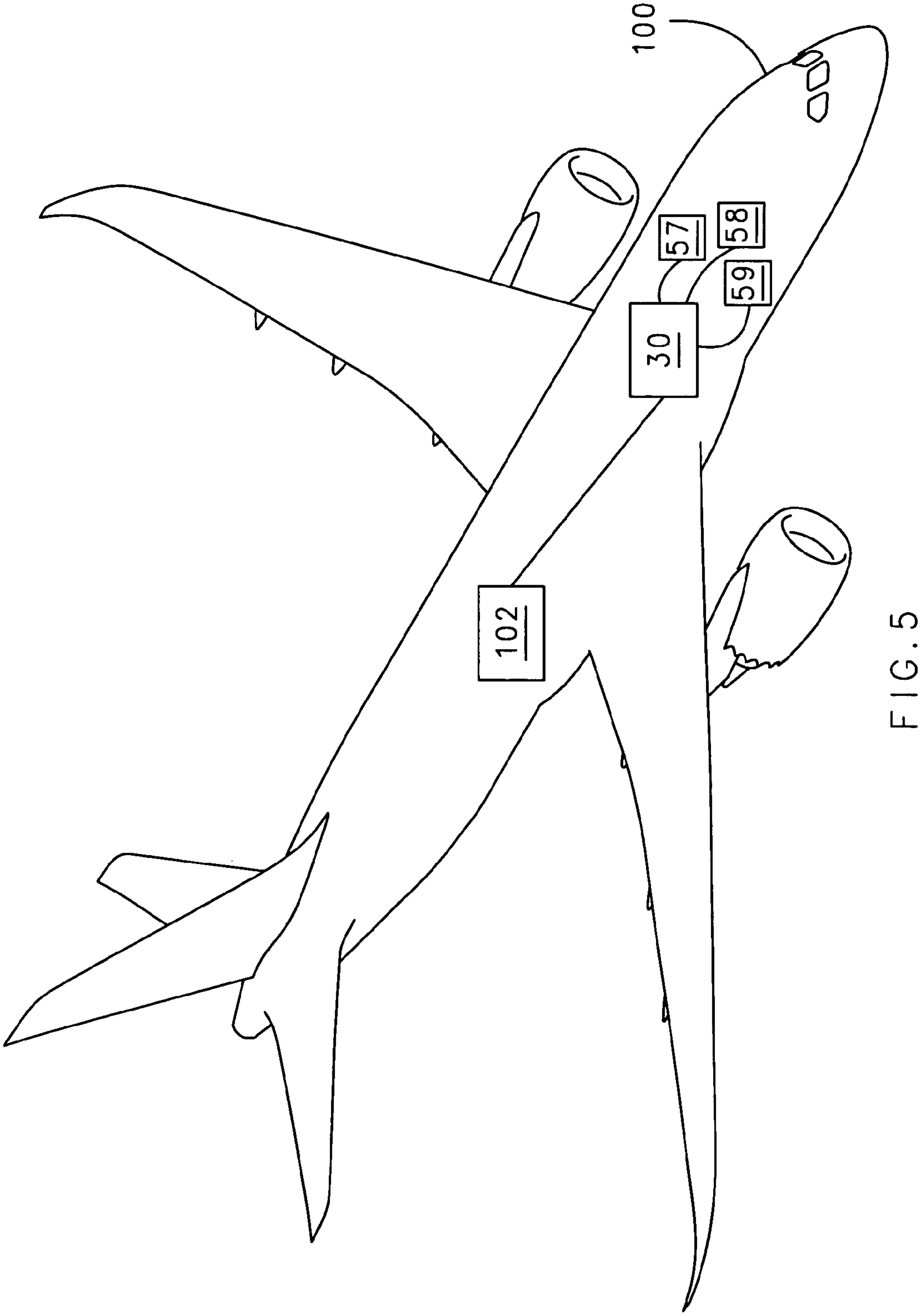
FIG. 5 illustrates the present invention in the example environment of an aircraft.

FIG. 5 illustrates the present invention in the example environment of an aircraft. Contactor 30 is positioned between a power source 57 and a load 102. A controller unit 58 provides commands to the contactor 30, and a system controller 59 obtains data from the contactor 30.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A high voltage contactor, comprising:

a set of main contacts, wherein the main contacts provide a first current path;

a solid state switch in parallel with the main contacts, wherein the solid state switch provides a second, parallel current path, wherein the second, parallel current path diverts current away from the main contacts when the main contacts are being opened or closed, and wherein the first and second current paths provide a path for direct current;

a gate drive, wherein the gate drive is connected to the solid state switch and is operable to turn the solid state switch OFF or ON;

a contactor coil;

an actuator shaft, wherein the main contacts comprise spaced wires with a moving part to connect them, and wherein the contactor coil provides power to the actuator shaft to open and close the main contacts;

a first current sensor, wherein the first current sensor monitors the status of the contactor coil;

a controller, which is operable to control the gate drive;

a pulse-width modulation driver connected to the controller and connected to the first current sensor, wherein the pulse-width modulation driver powers the contactor coil, and wherein the controller controls the pulse-width modulation driver;

a discrete output module, wherein the discrete output module obtains information about the status of the main contacts from the controller;

a control connector, wherein the control connector obtains contactor status data from the discrete output module, and transmits that data to an external component, and wherein the control connector is controlled by the controller; and a power supply, which obtains power from an external power source, and distributes the power to the controller, the gate drive, and the control connector.

2. The contactor as recited in claim 1, further comprising a second current sensor, wherein the second current sensor is operable to detect fault conditions and to notify the controller of any such conditions.

3. The contactor as recited in claim 2, further comprising a set of auxiliary contacts in series with the solid state switch, wherein the actuator shaft is also operable to open and close the auxiliary contacts, and wherein the discrete output module also obtains status data from the auxiliary contacts.

4. A high voltage contactor, comprising:

a set of main contacts, wherein the main contacts provide a first current path;

a solid state switch in parallel with the main contacts, wherein the solid state switch provides a second, parallel current path, and wherein the second, parallel current path diverts current away from the main contacts when the main contacts are being opened or closed;

a discrete output module, wherein the discrete output module obtains information about the status of the main contacts from a controller; and a control connector, wherein the control connector obtains contactor status data from the discrete output module and transmits that data to an external component, and wherein the control connector is controlled by the controller.

5. The contactor as recited in claim 4, wherein the solid state switch is closed prior to an opening or closing of the main contacts, and wherein the solid state switch is opened after an opening or closing of the main contacts.

6. The contactor as recited in claim 5, wherein an actuator shaft is operable to close the main contacts and the auxiliary contacts, and wherein the actuator shaft closes the auxiliary contacts prior to the solid state switch being closed, and wherein the actuator shaft is operable to open the auxiliary contacts after the solid state switch is opened.

7. The contactor as recited in claim 4, further comprising a gate drive, wherein the gate drive is connected to the solid state switch and is operable to turn the solid state switch OFF or ON.

8. The contactor as recited in claim 7, further comprising:

a contactor coil; and an actuator shaft, wherein the main contacts comprise spaced wires with a moving part to connect them, and wherein the contactor coil provides power to the actuator shaft to open and close the main contacts.

9. The contactor as recited in claim 4, wherein the solid state switch comprises a transistor and a diode in parallel.

10. The contactor as recited in claim 4, wherein the solid state switch comprises a first transistor and a first diode pair in parallel with each other, coupled in series to a second transistor and a second diode pair in parallel with each other.

11. The contactor as recited in claim 10, wherein the first diode is operable to conduct current towards the second diode, and the second diode is operable to conduct current towards the first diode.

12. The contactor as recited in claim 4, further comprising a set of auxiliary contacts in series with the solid state switch, wherein the auxiliary contacts provide galvanic isolation between an input terminal and an output terminal.

13. The contactor as recited in claim 12, wherein a structure is operable to open or close the auxiliary contacts.

14. The contactor as recited in claim 4, wherein the first current path and the second current paths are direct current paths.

* * * * *